(12) United States Patent
Held

(10) Patent No.: US 11,959,327 B2
(45) Date of Patent: Apr. 16, 2024

(54) FLUID DAMPER FOR PARTS THAT ARE MOVABLE RELATIVE TO ONE ANOTHER, COMPRISING A PISTON GUIDED MOVABLY IN A CYLINDER

(71) Applicant: Wolfgang Held, Hard (AT)

(72) Inventor: Wolfgang Held, Hard (AT)

( * ) Notice: Subject to any disclaimer, the term of this patent is extended or adjusted under 35 U.S.C. 154(b) by 915 days.

(21) Appl. No.: 16/635,972

(22) PCT Filed: Aug. 8, 2018

(86) PCT No.: PCT/EP2018/071459
§ 371 (c)(1),
(2) Date: Mar. 22, 2021

(87) PCT Pub. No.: WO2019/030258
PCT Pub. Date: Feb. 14, 2019

(65) Prior Publication Data
US 2021/0207416 A1    Jul. 8, 2021

(30) Foreign Application Priority Data
Aug. 9, 2017 (EP) ..................... 17185525

(51) Int. Cl.
*E05F 3/12* (2006.01)
*F16F 9/19* (2006.01)
(Continued)

(52) U.S. Cl.
CPC ................ *E05F 3/12* (2013.01); *F16F 9/19* (2013.01); *F16F 9/3214* (2013.01);
(Continued)

(58) Field of Classification Search
CPC ....... E05F 1/00; E05F 1/08; E05F 1/10; E05F 3/12; E05F 5/08; F16F 9/19; F16F 9/3214; F16F 9/3405; F16F 9/512; F16F 9/516
(Continued)

(56) References Cited

U.S. PATENT DOCUMENTS 5,507,070 A * 4/1996 Spyche, Jr. .......... A61G 17/032
                                                          16/49
10,670,063 B2 * 6/2020 Artin ....................... F16B 7/105
(Continued)

FOREIGN PATENT DOCUMENTS

DE          69821909 T2    12/2004
DE       102004008956 A1    9/2005
(Continued)

*Primary Examiner* — Roberta S Delisle
(74) *Attorney, Agent, or Firm* — John Alumit

(57) ABSTRACT

The invention describes a fluid damper for furniture parts that are movable relative to one another, said fluid damper comprising a piston (4) guided movably in a cylinder (1) along a longitudinal axis. At least one through opening (4.1, 4.2) for fluid flowing through is provided in the piston (4) and/or between the piston (4) and cylinder (1). A sleeve (2) is arranged so as to be radially rotatable, relative to the piston (4) against a spring loading, about the longitudinal axis or about an axis running parallel thereto, which sleeve comprises, on its circumference, a number of wings (2.1, 2.2, 2.1', 2.2') corresponding to the number of through openings (4.1, 4.2). The spring loading is directed such that the wing (2.1, 2.2, 2.1', 2.2') exposes the through opening (4.1, 4.2) when the piston (4) is stationary in the cylinder (1) and in the event of a movement in a movement direction of the piston (4) and of the cylinder (1) relative to one another along the longitudinal axis, and progressively closes said through opening in the event of a movement against the movement direction with increasing relative speed between (Continued)

the piston (4) and cylinder (1) along the longitudinal axis. The fluid damper comprises a hollow-cylindrical part of the piston (4), which surrounds the sleeve (2) and the at least one wing (2.1, 2.2, 2.1', 2.2'), which is arranged on the circumference of said sleeve, along at least part of the longitudinal axis thereof.

16 Claims, 6 Drawing Sheets

(51) Int. Cl.
*F16F 9/32* (2006.01)
*F16F 9/34* (2006.01)
*F16F 9/512* (2006.01)
*F16F 9/516* (2006.01)

(52) U.S. Cl.
CPC .......... *F16F 9/3405* (2013.01); *F16F 9/512* (2013.01); *F16F 9/516* (2013.01); *E05Y 2201/21* (2013.01); *E05Y 2201/264* (2013.01); *E05Y 2900/20* (2013.01); *F16F 2222/12* (2013.01)

(58) Field of Classification Search
USPC .......................................... 16/71–72, 82, 85
See application file for complete search history.

(56) References Cited

U.S. PATENT DOCUMENTS

| | | | |
|---|---|---|---|
| 11,261,639 B2* | 3/2022 | Held | E05F 5/10 |
| 2009/0223759 A1* | 9/2009 | Kim | F16F 9/19 |
| | | | 188/297 |
| 2012/0175830 A1* | 7/2012 | Yang | F16F 9/0218 |
| | | | 267/140.13 |
| 2013/0020159 A1* | 1/2013 | Groves | F16F 9/34 |
| | | | 188/315 |
| 2016/0069118 A1* | 3/2016 | Artin | E05C 17/30 |
| | | | 16/85 |
| 2017/0198780 A1* | 7/2017 | Nakasone | E05F 5/02 |
| 2020/0141467 A1* | 5/2020 | Mohammadi | B60G 13/005 |
| 2020/0240190 A1* | 7/2020 | Held | E05F 5/10 |
| 2021/0025471 A1* | 1/2021 | Kobayashi | F16F 9/185 |
| 2022/0333664 A1* | 10/2022 | Kasprzyk | F16F 9/185 |

FOREIGN PATENT DOCUMENTS

| | | |
|---|---|---|
| DE | 202014002228 U1 | 5/2014 |
| DE | 102015109188 A1 | 12/2015 |
| WO | WO2005045278 A1 | 5/2005 |

\* cited by examiner

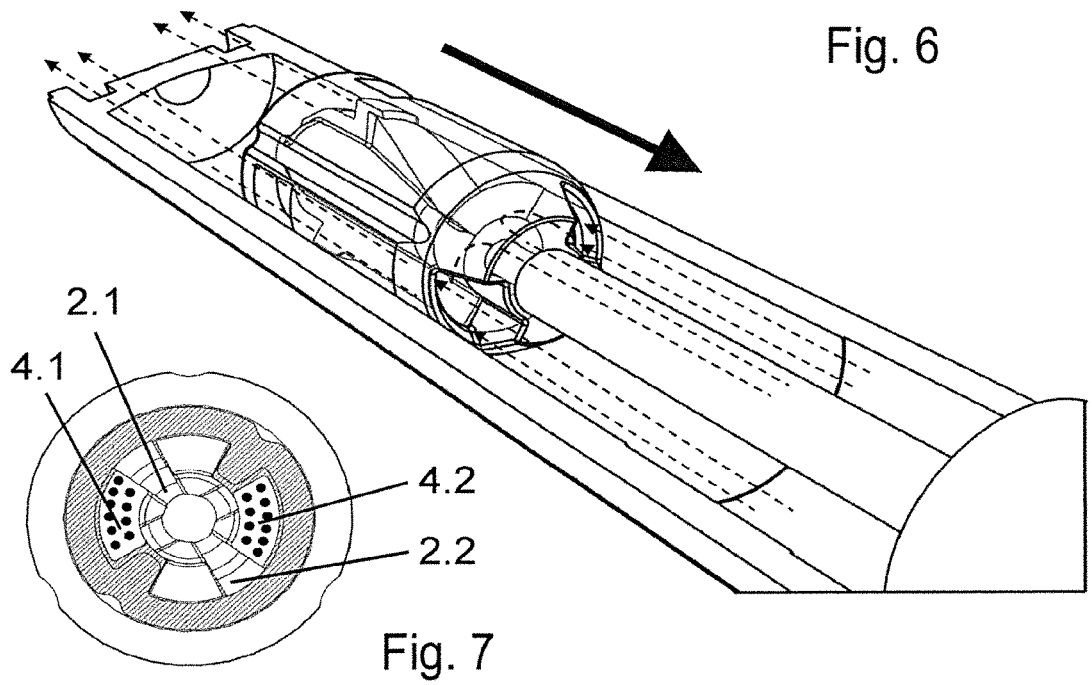
Fig. 6
Fig. 7
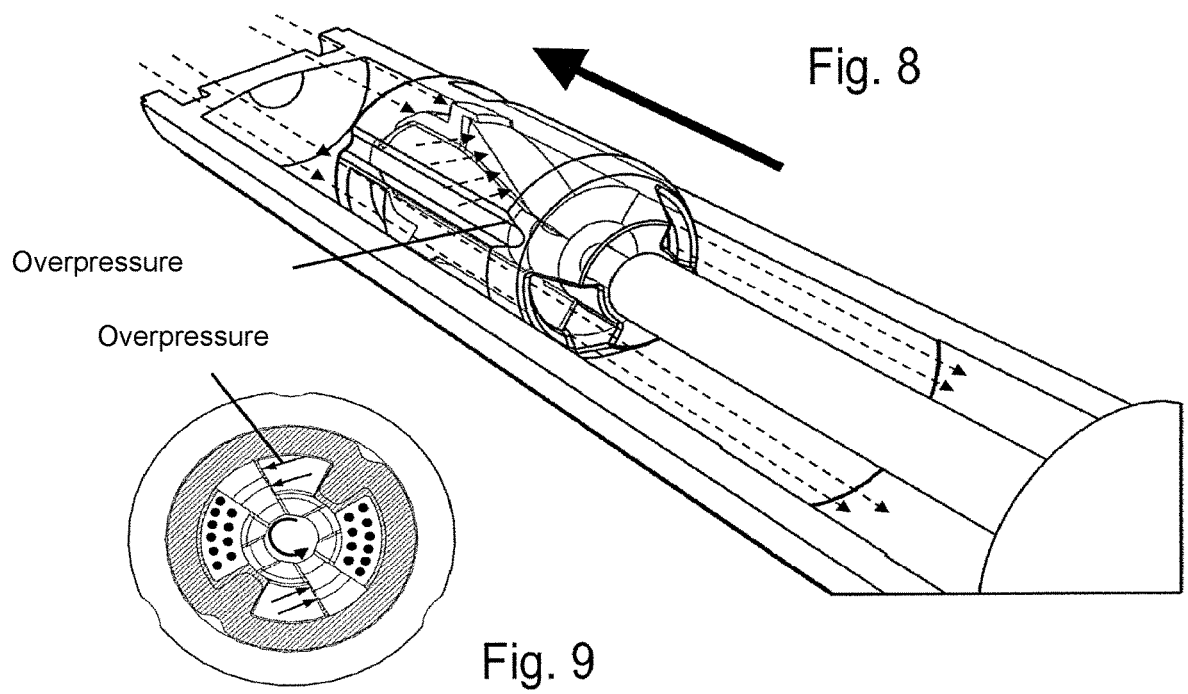
Fig. 8
Overpressure
Overpressure
Fig. 9

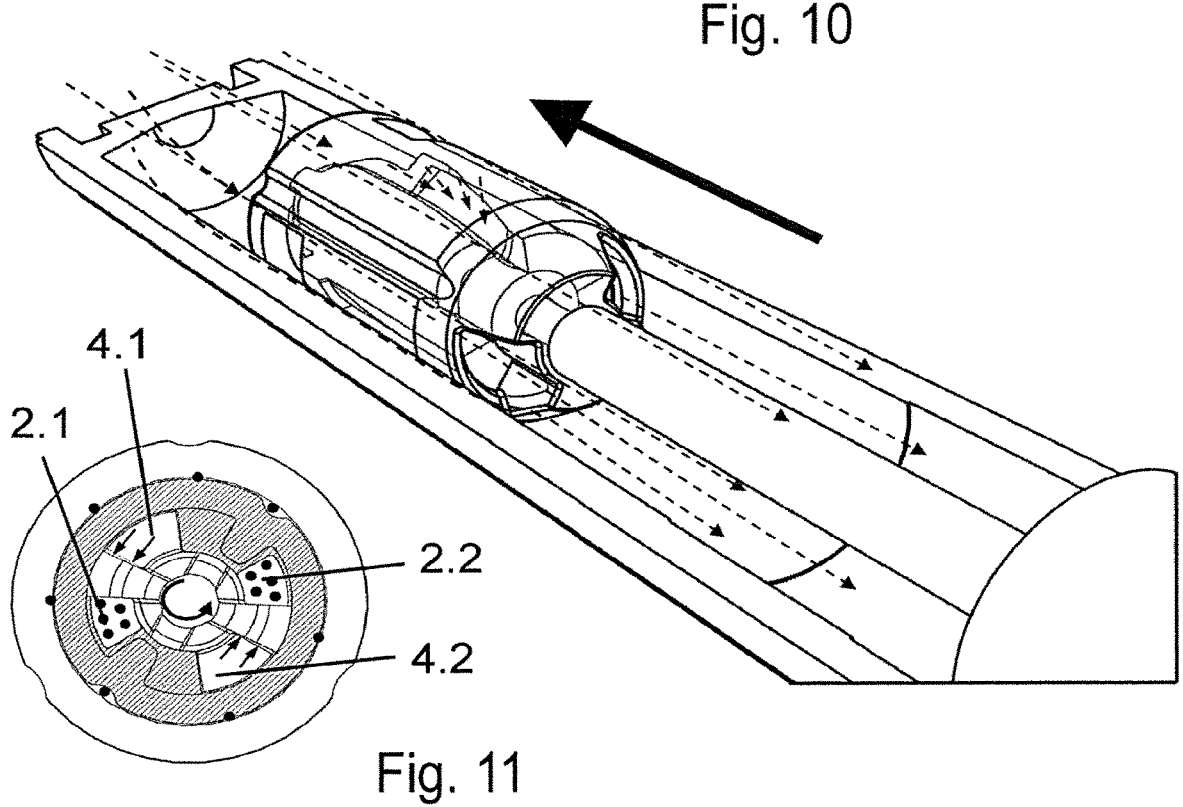
Fig. 10
Fig. 11
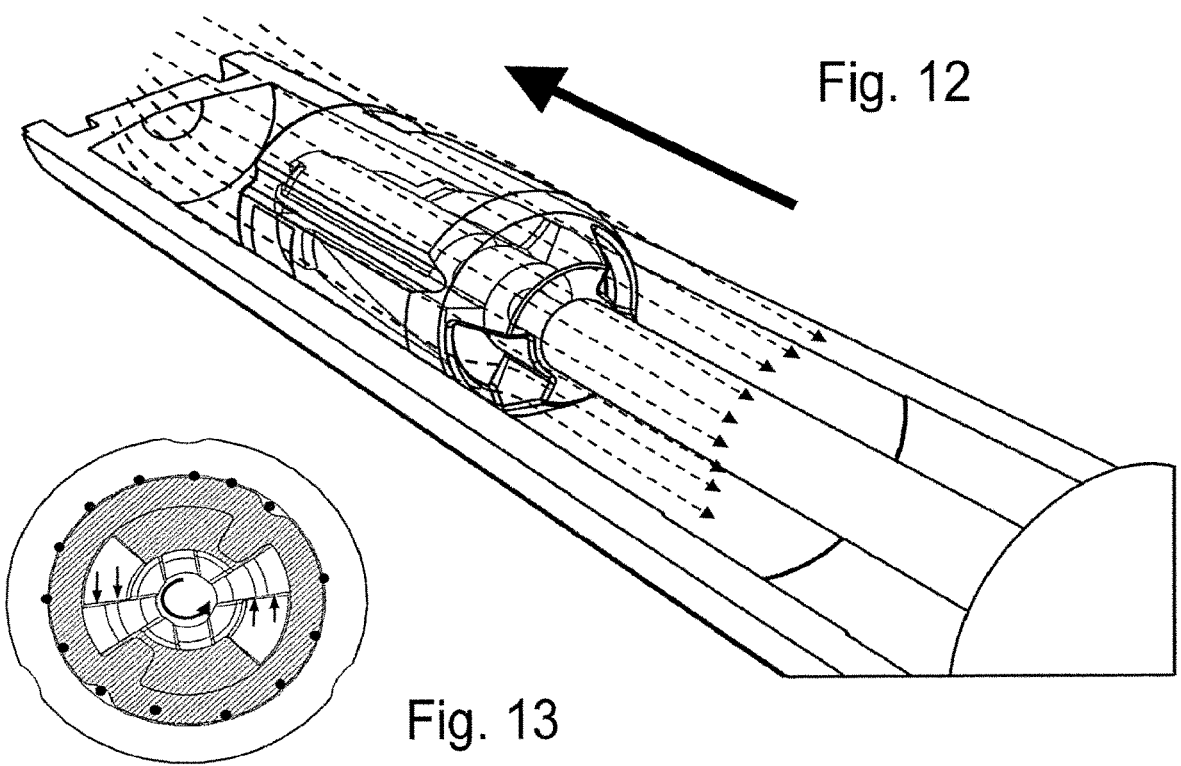
Fig. 12
Fig. 13

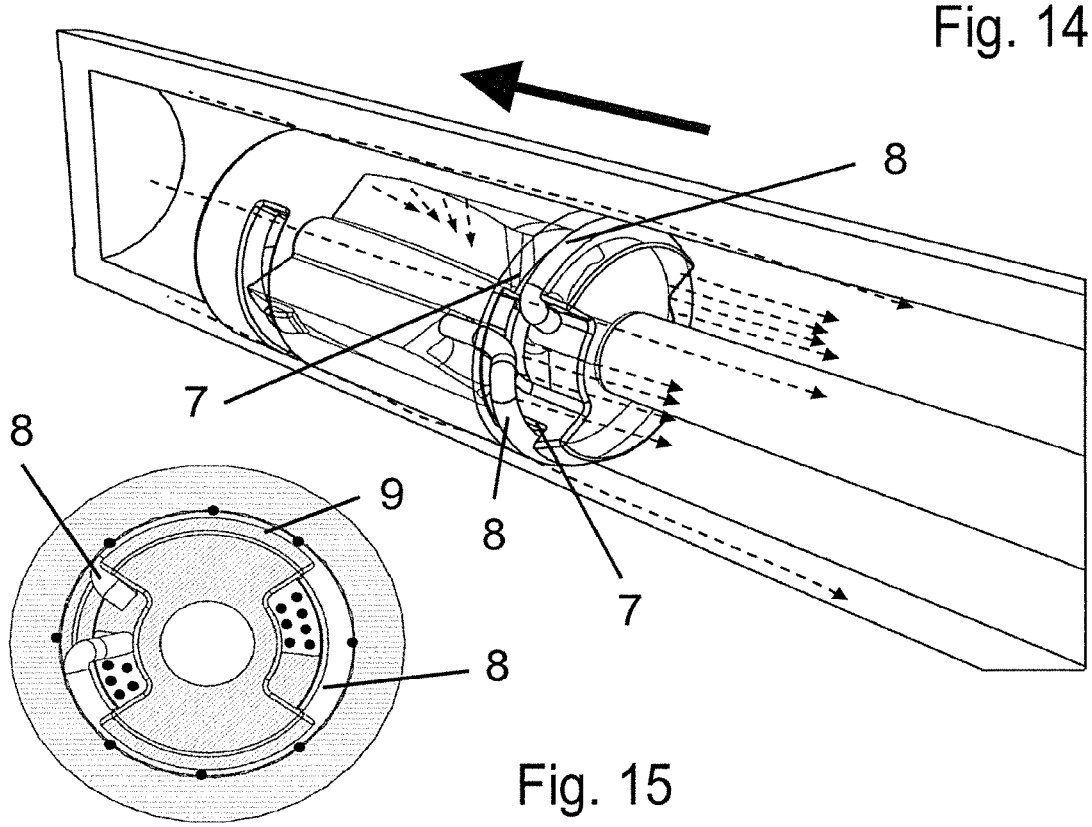
Fig. 14
Fig. 15
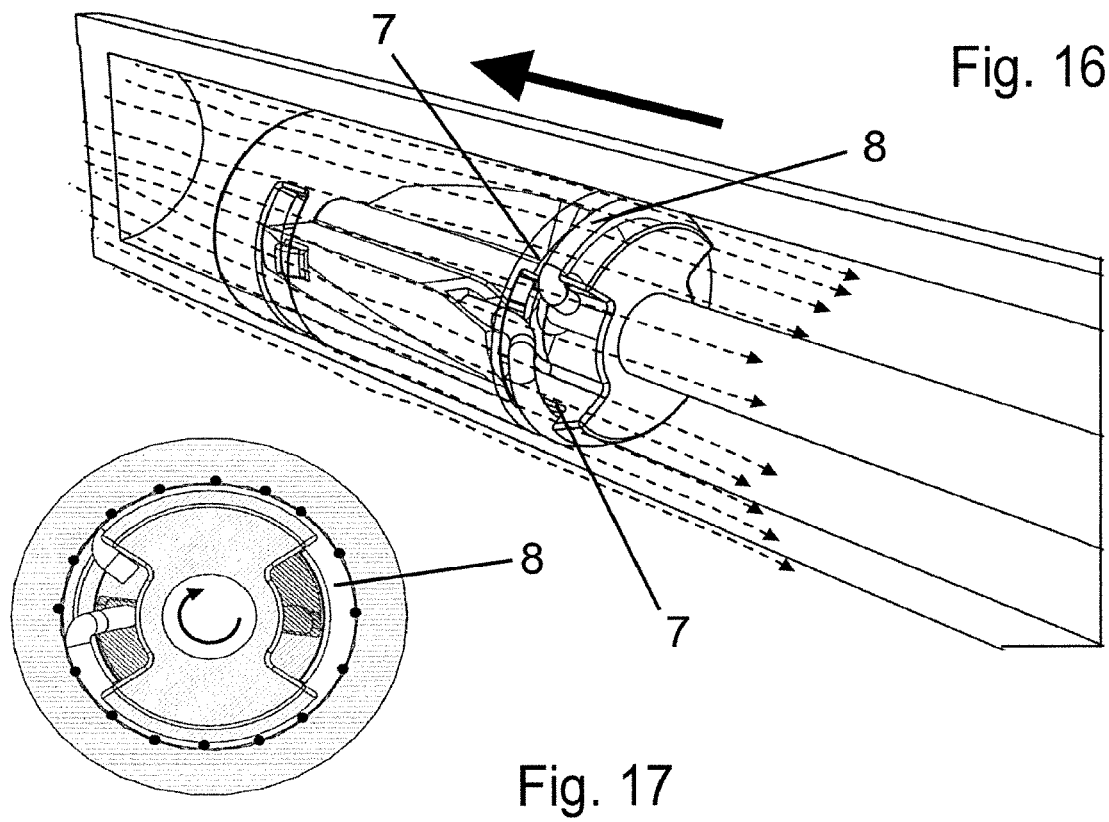
Fig. 16
Fig. 17

FLUID DAMPER FOR PARTS THAT ARE MOVABLE RELATIVE TO ONE ANOTHER, COMPRISING A PISTON GUIDED MOVABLY IN A CYLINDER

The invention relates to a fluid damper, that is, a damper with fluid, for furniture parts that are movable relative to one another having a piston, guided adjustably in a cylinder, as described in the preamble to claim 1.

In one such fluid damper in DE 20 2014 002 228 U1, the piston is connected to a piston rod extending out of the cylinder. The piston rod can be put into contact with an adjustable furniture part. The cylinder is connected by its end that is closed and free of a piston rod to the fixed furniture part. In the piston, a through opening for a fluid located in the cylinder is provided. When the furniture parts move relative to one another, a wing supported rotatably on the piston closes progressively in the piston as a function of the speed or the pressure on the piston rod. When the furniture parts move away from one another, a spring moves the wing on the piston back and opens the through opening. The cylinder is closed on the open face end with a closure part. The piston has a perpendicular cylindrical part, which, viewed in the axial direction, extends in the axial direction of the piston rod over the entire height of the wing. This perpendicular cylindrical part, viewed over the height of the wing, has a circular portion as a sectional plane.

For assembly, during the insertion of the piston rod into the piston, the wing and the spring restoring the piston rod must be placed in a recess in the piston. Next, the piston rod must be thrust up to the end of the piston simultaneously by one central opening each in the spring and the wing, which involves great effort and skill in assembly.

A fluid damper is also known from DE 20 2005 020 820 U1. So that in this known fluid damper in the event of an overload, that is, with great imposition of pressure, extreme damping is prevented, it is proposed that above a threshold value of the pressure load impacting the fluid damper, at least one overload opening in the piston and/or between the piston and the cylinder is opened. This prevents the damper from rebounding. Furthermore, hard closing of the furniture parts is averted without attaining the threshold value of the pressure load by means of a special embodiment of the through opening in the piston or between the piston and cylinder, and without requiring the choice of special forms and sizes of the through openings.

From DE 698 21 909 T2, a motion-controlling device with a piston guided adjustably in a cylinder is known. In the piston, a through opening for fluid flowing through is provided. In the piston, a through opening is provided for fluid flowing through. The piston has spring-loaded wings, which cooperate with the through opening. The cooperation provides that when the piston is at a standstill, the through opening is closed and is opened only counter to a high initial pressure. Once opened, the necessary pressure on the piston rod drops. At a new stop at an arbitrary position, the high initial pressure is again necessary. The motion-controlling device is not suitable as a fluid damper for furniture parts that are movable relative to one another, because it would result in constant damper chatter, and when the furniture parts close, they hit each other hard.

From DE 10 2015 109 188 A1, a fluid damper for furniture parts that are movable relative to one another is known. The fluid damper includes a piston guided adjustably in a cylinder. In the piston, a through opening for fluid flowing through is provided. Depending on the speed or pressure on the piston rod when the furniture parts move relative to one another, a wing supported rotatably on the piston closes the through opening more and more. When the furniture parts move away from one another, a spring returns the wing to where it was, and the wing opens the through opening again.

From U.S. Pat. No. 7,410,154 B2, a fluid damper for furniture parts that are movable relative to one another is known. The fluid damper includes a piston guided adjustably in a cylinder. In the piston, a through opening for fluid flowing through is provided. A cover element is located rotatably on the piston rod. A rotation in one direction results in an increasing closure, and a rotation in the opposite direction results in an increasing opening, of the through opening. A rotation element is connected to the cover element. If the rotation element slides along the piston rod, it rotates the cover element. Located between the rotation element and the cover element is a restoring element, which returns the rotation element to its outset position, along with opening the through opening.

From U.S. Pat. No. 8,925,695 B2, a fluid damper for furniture parts that are movable relative to one another is known. The fluid damper includes a piston guided adjustably in a cylinder. In the piston, a through opening for fluid flowing through is provided. The fluid damper includes a valve element of elastomer.

The object of the invention is to further improve the fluid damper of the preamble to claim 1. This stated object is attained by the features of claim 1.

One advantage resulting from this is among others simplified assembly. The piston and the spring-loaded closing element along with its sleeve can be installed beforehand, located radially rotatably relative to the piston, the sleeve being retained in transverse grooves of the piston. The transverse grooves can for instance be in the form of guide elements radially protruding transverse grooves that movable independently of the piston rod.

The transverse grooves enable radial rotation of the sleeve relative to the piston. The length of the transverse grooves in the circumferential direction defines the range of rotation. In the longitudinal direction axially to the length of the piston and of the piston rod bearing the piston, the sleeve is kept immovable relative to the piston by the guide elements engaging the transverse groove.

A spring generating a spring loading can for instance be inserted between the sleeve and the piston in the preassembly of the sleeve and piston. Alternatively, later, for instance after the preassembly of the sleeve and piston, the spring can either be inserted between the sleeve and the piston or can be effectively located on the outside between the sleeve and the piston.

Additional advantages are gained, because as a result of this type of control of the through openings in the piston, the components of the piston have symmetrical loads. This increases the stability of the fluid damper and reduced wear of these components.

Further embodiments of the fluid damper can be learned from the dependent claims.

For instance, adjoining the inner end face of the closure part is a pistonlike, sievelike fluid displacement element, through which the piston rod is guided and which has sieve openings on its circumferential surface and its inner end face.

The fluid displacement element is preferably located such that it is displaceable coaxially to the longitudinal axis of the piston rod, for instance being located displaceably on the piston rod.

In a further embodiment of the fluid damper, the fluid displacement element is embodied as a plastic foam element.

In a further embodiment of the fluid damper, the through opening regions, embodied in sievelike fashion in the piston, extend over an angle of preferably 10°-40° each of the circumference of the piston.

In a further embodiment of the fluid damper, the helical spring keeps the sleeve in the retracted position when the through opening regions are open.

In a further embodiment of the fluid damper, when the piston rod moves at high speed from the outset position, the wings close the through opening regions in the piston, except for a small cross section. The flow of the fluid through the through openings in the piston is therefore less.

As fluid, oil is preferably used in the cylinder.

The two regions of the fluid through openings in the piston extend preferably over an angle of 10°-40° each of the piston circumference.

With the furniture parts open, in the outset position, the piston lies above the fluid displacement element on the closure part. The helical spring keeps the wing in the retracted position when the fluid through openings are open.

The invention will now be described in further detail in conjunction with drawings. In the drawings:

FIG. 6 is a perspective view of the fluid damper similar to FIGS. 4 and 5, showing where the components of the fluid damper are located when the piston is at reduced speed;

FIG. 7 is a cross section through the fluid damper of FIG. 6 at the point where the wings in the piston are under low pressure load;

FIG. 8 is a perspective view of the fluid damper similar to FIGS. 4 and 5, showing where the components of the fluid damper are located when the piston speed is beginning to be increased;

FIG. 9 is a cross section through the fluid damper of FIG. 8 at the point where the wings in the piston are located when the speed of the piston is beginning to be increased;

FIG. 10 is a perspective view of the fluid damper, similar to FIGS. 4 and 5, in which the components of the fluid damper are located when the piston speed has increased;

FIG. 11 is a cross section through the fluid damper of FIG. 10, at the point where the wings in the piston are located when the piston speed has increased;

FIG. 12 is a perspective view of the fluid damper similar to FIGS. 4 and 5, in which the components of the fluid damper are located if the spring force is insufficient to keep the through opening open;

FIG. 13 is a cross section through the fluid damper of FIG. 12, at the point where the wings are located in the piston;

FIG. 14 is a perspective view of a further exemplary embodiment of a fluid damper, similar to FIGS. 4 and 5, showing location of the components of the fluid damper at low speed or just at the onset of motion of the piston;

FIG. 15 is a cross section through the fluid damper of FIG. 14, showing where the wings are located in the piston when the speed of the piston has increased;

FIG. 16 is a perspective view of the fluid damper of FIG. 14, showing where the components of the fluid damper are located when the speed has suddenly increased;

FIG. 17 is a cross section through the fluid damper of FIG. 14, showing where the wings in the piston are located when the speed of the piston is suddenly increased;

Figure 1:
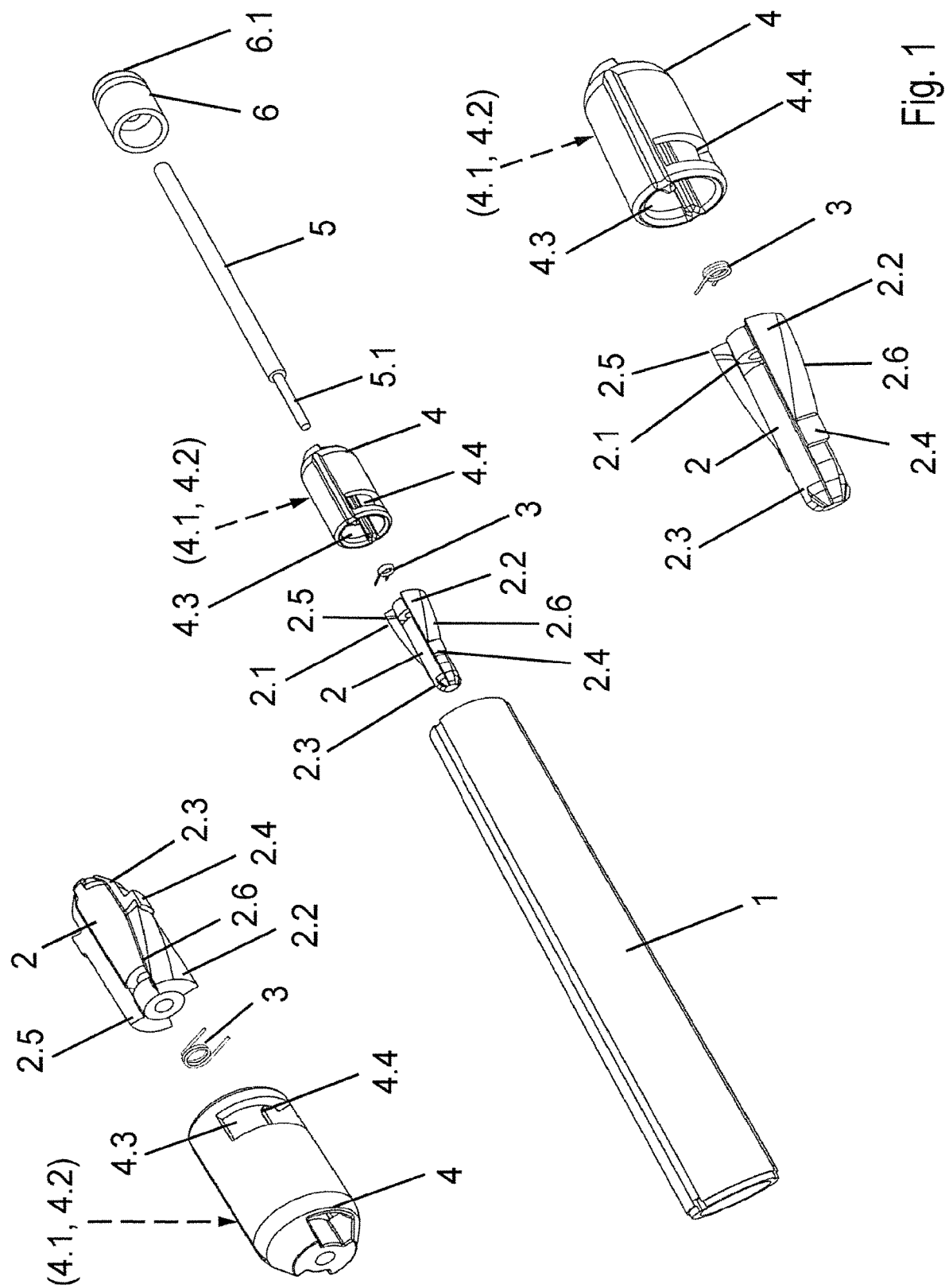
FIG. 1 is a perspective exploded view of a fluid damper with a cylinder, a sleeve, a spring, a piston, a piston rod, and a closure part.

A fluid damper, shown in FIGS. 1 through 19 in its entirety or in parts, for furniture parts that are movable relative to one another is equipped with a piston 4 guided displaceably in a cylinder 1 along the longitudinal axis of the cylinder.

The piston 4 is embodied cylindrically and is adapted with its external diameter to the internal diameter of the cylinder 1.

The piston 4 subdivides the cylinder into two fluid chambers. In the piston 4 and/or between piston 4 and cylinder 1, at least one through opening 4.1, 4.2 for fluid flowing through is provided. As a result, upon a motion of the piston 4 in the cylinder along the longitudinal axis or cylindrical axis of the piston, a fluid exchange can take place between the two fluid chambers.

At least one closing element spring-loaded relative to the piston 4 is associated with the at least one through opening 4.1, 4.2. The closing element has a number of closing surfaces equivalent to the number of through openings 4.1, 4.2.

The closing element includes a sleeve 2, which is located rotatably relative to the piston 4 counter to a spring loading about the longitudinal axis or about an axis extending parallel thereto—in short, it is located radially. The sleeve 2 on its circumference has a number of through openings 4.1, 4.2 corresponding to the number of wings 2.1, 2.2; 2.1', 2.2', forming or including the closing surfaces.

In this connection, it should be emphasized that in the present document, the term "axis", in contrast to the terms "shaft" or "piston rod", means a geometrical axis, not a machine element.

The wings 2.1, 2.2; 2.1', 2.2' are, as described below, capable of being operatively connected to the through opening 4.1, 4.2.

The spring loading between the piston 4 and the closing element is arranged such that 1. if the piston 4 is not in motion relative to the longitudinal axis of the cylinder 1, the at least one wing/vin 2.1, 2.2; 2.1', 2.2' opens the at least one through opening 4.1, 4.2;
2. if the piston 4 is moved in a first direction relative to the cylinder 1, the at least one wing 2.1, 2.2; 2.1', 2.2' opens the at least one through opening 4.1, 4.2; and
3. upon a motion counter to the movement direction recited in item 2 of this paragraph, the at least one wing/vane 2.1, 2.2; 2.1', 2.2' closes the at least one through opening 4.1, 4.2 progressively with increasing relative speed between the piston 4 and cylinder 1 along the latter's longitudinal axis.

The fluid damper includes a hollow-cylindrical part of the piston 4. This part, with its wall, completely surrounds the sleeve 2 and the at least one wing 2.1, 2.2; 2.1', 2.2', located on the circumference of the sleeve, along at least a portion of its longitudinal axis extending parallel to the axis of the cylinder in the radial direction. The longitudinal axis, which is called that to better distinguish it, of the hollow cylindrical part of the piston 4 is also called the hollow-cylindrical part axis and is either the same as the longitudinal axis already mentioned or extends parallel to it. Along that longitudinal axis, the piston 4 is adjustably guided in the cylinder 1.

In the prior art, the piston has a vertical cylindrical part, which in the axial direction of the piston rod extends over the entire height of the wing and which, viewed over the entire height of the wing, has a circular portion in the form of a sectional plane.

In the invention, conversely, the wall of the hollow-cylindrical part, viewed in the circumferential direction, entirely surrounds the at least one wing 2.1, 2.2; 2.1', 2.2', located on the circumference of the sleeve 2, at least along a portion of the hollow-cylindrical part axis extending parallel to the longitudinal axis and/or parallel to this wing. In the prior art, the vertical cylindrical part extends over the entire height of the wing viewed along the longitudinal axis. However, viewed in the circumferential direction, it does not surround the wing at all, or surrounds it only partially.

It is apparent that because of its hollow cylindrical shape, the hollow-cylindrical part of the piston 4 in at least some regions entirely surrounds the sleeve 2 and the at least one wing 2.1, 2.2; 2.1', 2.2' located on the circumference of the sleeve. This can preferably be the case at least along a portion of its longitudinal axis. Preferably, the piston surrounds the sleeve in the radial direction, or in other words in the circumferential direction of the sleeve 2. The longitudinal axis can extend parallel to the axis of the cylinder and can also be called a hollow cylindrical part axis.

Preferably, the sleeve 2, with the at least one wing 2.1, 2.2; 2.1', 2.2' that is supported by the sleeve forming the closing element and is located radially rotatably relative to the piston 4, is locked to the piston 4. Here, a radial rotatability and a fixation relative to the piston and/or the sleeve in the axial direction is retained.

This kind of locking preferably includes a detent connection that fixes the sleeve 2 in the axial direction of the piston 4 and keeps it radially rotatable. This detent connection can for instance be formed by guide elements 2.3, 2.4 that engage transverse grooves 4.3, 4.4 of the piston 4.

The transverse grooves 4.3, 4.4 can for instance be located in the hollow-cylindrical part of the piston 4.

The guide elements 2.3, 2.4 can preferably be located on the sleeve 2, from which they radially protrude. The guide elements are in correspondence with the transverse grooves in the axial direction of the longitudinal axis of the hollow-cylindrical part. In the circumferential direction, the guide elements are embodied as shorter than the transverse grooves 4.3, 4.4, in order to ensure the rotatability of the sleeve 2 relative to the piston 4.

The distribution of the guide elements 2.3, 2.4 past the outer circumference/outer side 2.5 of the sleeve 2 is equivalent to the distribution of the transverse grooves 4.3, 4.4 past the inner circumference of the hollow-cylindrical part of the piston 4. Preferably, a uniform distribution over the circumferences is provided.

It should be emphasized that the guide elements 2.3, 2.4 can alternatively be provided on the inner circumference of the hollow-cylindrical part of the piston 4, and the transverse grooves 4.3, 4.4 can be provided on the outer circumference of the sleeve 2. It is equally possible, for example, for the sake of the position and location mounting the sleeve 2 and piston 4 are mounted, to provide guide elements 2.3, 2.4 both on the inner circumference of the hollow-cylindrical part of the piston 4 and on the outer circumference of the sleeve 2. Transverse grooves 4.3, 4.4, located opposite the respective other part, can be associated with them. This makes it possible to avoid mistakes in assembly, because the closing element, by means of an appropriate coding-type arrangement of transverse grooves 4.3, 4.4 and guide elements 2.3, 2.4, can be inserted into the hollow-cylindrical part of the piston 4 in only exactly one orientation and one rotary position and locked in place there.

In summary, the sleeve 2 is accordingly kept radially rotatable, preferably by means of guide elements 2.3, 2.4 in transverse grooves 4.3, 4.4, for instance of the piston 4.

Preferably, the closing element progressively closes the through openings 4.1, 4.2 counter to a pressure load on the fluid damper and opens them both not only when the fluid damper is unstressed but also when there is a tensile stress on the fluid damper.

When there is a motion of the piston rod 5 out of the outset position at high speed, the wings 2.1, 2.2 close the through opening regions 4.1, 4.2 in the piston 4, except for a small cross section.

The closing surfaces and the flow surfaces are, as already mentioned, preferably included and/or formed by wings 2.1, 2.2; 2.1', 2.2'.

The wings 2.1, 2.2; 2.1', 2.2' preferably and advantageously protrude from the sleeve 2 radially to the longitudinal axis of the cylinder. As a result, they protrude freely into a fluid flow that becomes established upon a fluid exchange between the two fluid chambers, and this goes along with a circumferential flow that is the best possible. Especially preferably, the wings extend along an inside of the piston axially along the longitudinal axis of the cylinder. Especially preferably, the wings alternatively or in addition also extend along an outside/outer circumference of the sleeve in the longitudinal direction of the cylinder, preferably between the sleeve and the piston.

Preferably, the sleeve 2, on its circumference in the longitudinal direction, has two wings 2.1, 2.2; 2.1', 2.2' opposite one another and forming the flow surfaces. The outer surfaces of these wings include the closing surfaces, which are displaceable for their closure via two through openings 4.1, 4.2, also called fluid passage regions formed in the piston 4 and/or between the piston 4 and the cylinder 1.

Preferably, for the following reason yet to be mentioned, at least two through openings 4.1, 4.2 for fluid to flow through are provided, preferably distributed uniformly over the circumference.

The sleeve 2, on its circumference, depending on the location of the through openings 4.1, 4.2, includes flow surfaces located in distributed fashion.

The flow surfaces are embodied such that because of the fluid bathing them and when the piston 4 is moving along the longitudinal axis counter to the movement direction (counter to the first direction per 2.) of the cylinder 1, these surfaces rotate the sleeve 2 relative to the piston 4 counter to the spring loading, so that the closing surfaces progressively close the through openings 4.1, 4.2 as the relative speed increases.

One the one hand, the aforementioned reason now achieves simpler assembly, compared to only one flow surface, corresponding to only one positionally correct installation position, and on the other, it achieves greater operational reliability. When there is only one flow surface, the result is a one-sided stress, which can lead to seizing of the components that are movable relative to one another, or in other words the sleeve 2 and the piston 4. Two or more flow surfaces located opposite one another result in a symmetrical stress free of tilting moments and therefore have longer lives.

The piston 4 is advantageously connected to a piston rod 5 extended to the outside from the cylinder 1, which piston rod can be brought into contact with an adjustable furniture part.

The cylinder 1 can be connected to the closed end that has no piston rod as well as to the fixed furniture part.

Between the piston 4 and the closing element, preferably between the piston 4 and the sleeve 2 that forms the closing element with the at least one wing 2.1, 2.2; 2.1', 2.2' supported by it, a spring can be located, which produces a spring stress. Advantageously, this is a helical spring 3. This can be located in a space-saving way between the piston 4 and the sleeve 2.

The spring, preferably embodied as a helical spring 3, keeps the sleeve 2 in the retracted position when the through opening regions 4.1, 4.2 are open.

On its end also known as an open face end and embodied as free of any passage of the piston rod 5 through it, the cylinder 1 of the fluid damper can, be closed with a closure part 6.

The inner end face 4 of the closure part 6 can be adjoined by a pistonlike, sievelike fluid displacement element 7, through which the piston rod 5 is passed. The fluid displacement element 7 can have sieve openings 7.1-7.3 on its circumferential surface and on its inner end face.

The fluid displacement element 7 can be embodied for instance as a plastic foam element.

In the piston 4, sievelike fluid passage regions 4.1, 4.2 can be provided, which extend over an angle of preferably 10°-40° each of the circumference of the piston 4.

To prevent damper chatter, at least one compensation opening can be provided between cylinder 1 and piston 4, and/or in the piston 4 with which no wing is associated. This ensures that even at high relative speed between piston 4 and cylinder 1, an adequate fluid exchange can take place between the two fluid chambers that are separated by the piston 4.

In FIG. 1, the components of one exemplary embodiment of a fluid damper, which are to be located in the cylinder 1, are shown taken apart. The fluid damper shown in FIG. 1 consists of a cylinder 1, a sleeve 2, a helical spring 3, a piston 4, a piston rod 5, and a closure part 6. It is secured by the closed face end of the cylinder 1 to a fixed furniture part. In the cylinder 1, the piston 4 is located in fixed fashion, that is, nonrotatably relative to the piston, on the end of the piston rod 5 that is introduced into the cylinder 1. The piston rod 5 is accessible in the piston 4. On its end, the piston rod has the sleeve 2 that is closed on one end and that is radially rotatable on the tapered end 5.1 of the piston rod 5.

The sleeve 2, on its circumference in the longitudinal direction, has two opposed wings 2.1 and 2.2, the outer faces 2.5 and 2.6 of which can be slid, in order to close them, via two fluid opening regions 4.1 and 4.2 formed in the piston 4 (see FIGS. 7, 9, 11). The sleeve 2, on its outer surface, also has two cams as guiding elements 2.3 and 2.4 opposite one another, which are guided in transverse grooves 4.3 and 4.4 of the piston 4.

The helical spring 3, slipped onto the tapered end 5.1, is braced on the one hand on one of the wings 2.1, 2.2 and on the other on a stop of the piston 4, in such a way that these wings are offset counterclockwise in such a way that they open the through opening regions 4.1, 4.2 in the piston 4.

The open end of the cylinder 1 is closed with the closure part 6, which is adapted in its external diameter to the internal diameter of the cylinder 1. The piston rod 5 is passed to the outside, through the closure part 6, out of the cylinder 1 and, upon closure of the adjustable furniture part, can be put into contact with the adjustable furniture part.

Between the closure part 6 and the piston 4, a fluid displacement element 7, for instance in the form of a plastic foam element, can be located adjustably coaxially to the longitudinal axis of the piston rod 5, for instance being guided adjustably on the piston rod 5, as FIGS. 2-6, 8 and 10 show.

The piston 4 is adapted in its external diameter to the internal diameter of the cylinder 1 and is adapted for receiving the piston rod 5. The piston 4 is fixed nonrotatably on the smaller end portion 5.1 of the piston rod 5.

The closure part 6 with the collar 6.1 forms the termination of the piston rod 5.

Figure 2:
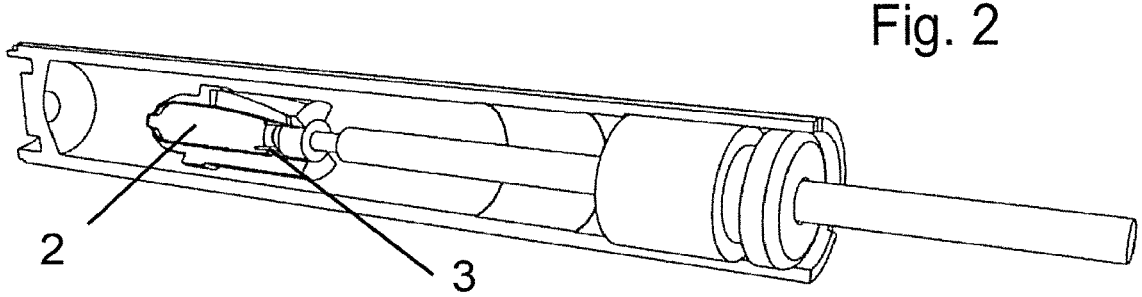
FIG. 2 is a perspective view of a further fluid damper, shown with the cylinder, sleeve, spring, piston rod, fluid displacement element, and closure part cut open.
Figure 3:
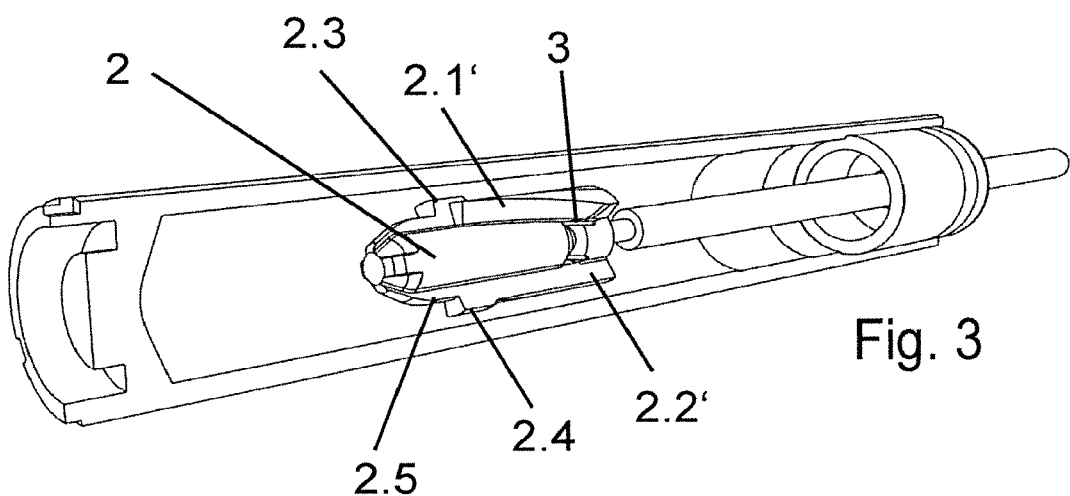
FIG. 3 is a further perspective view of the fluid damper of FIG. 2.
Figure 4:
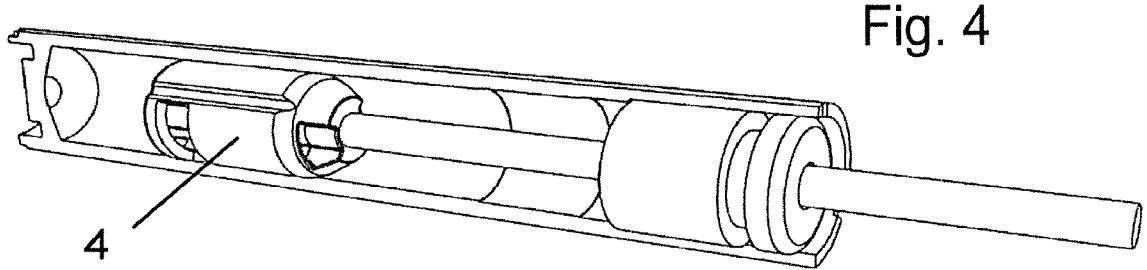
FIG. 4 is a perspective view similar to FIG. 2 of the fluid damper, but with a piston; it is a corresponding perspective view, showing where the components of the fluid damper are located when the piston is at high speed.
Figure 5:
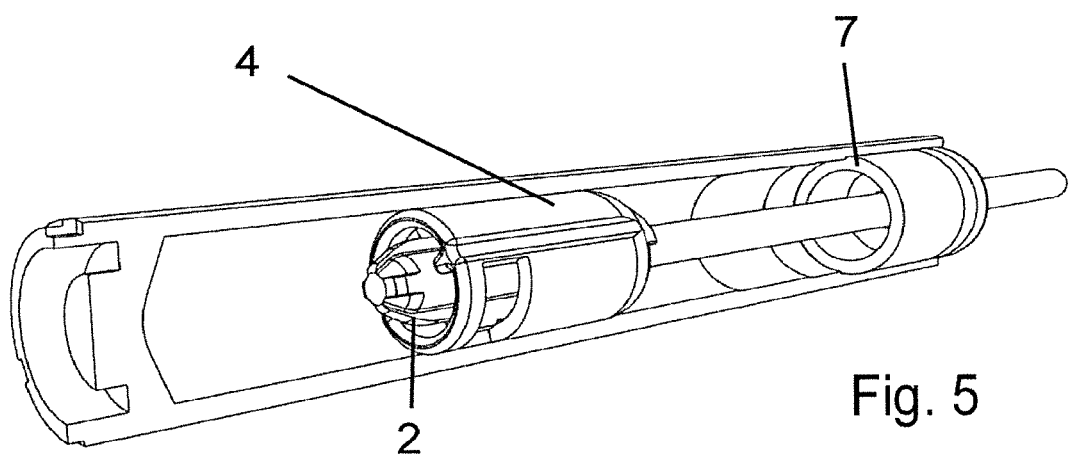
FIG. 5 is a perspective view of the fluid damper similar to FIG. 3, but with a piston.
Figure 18:
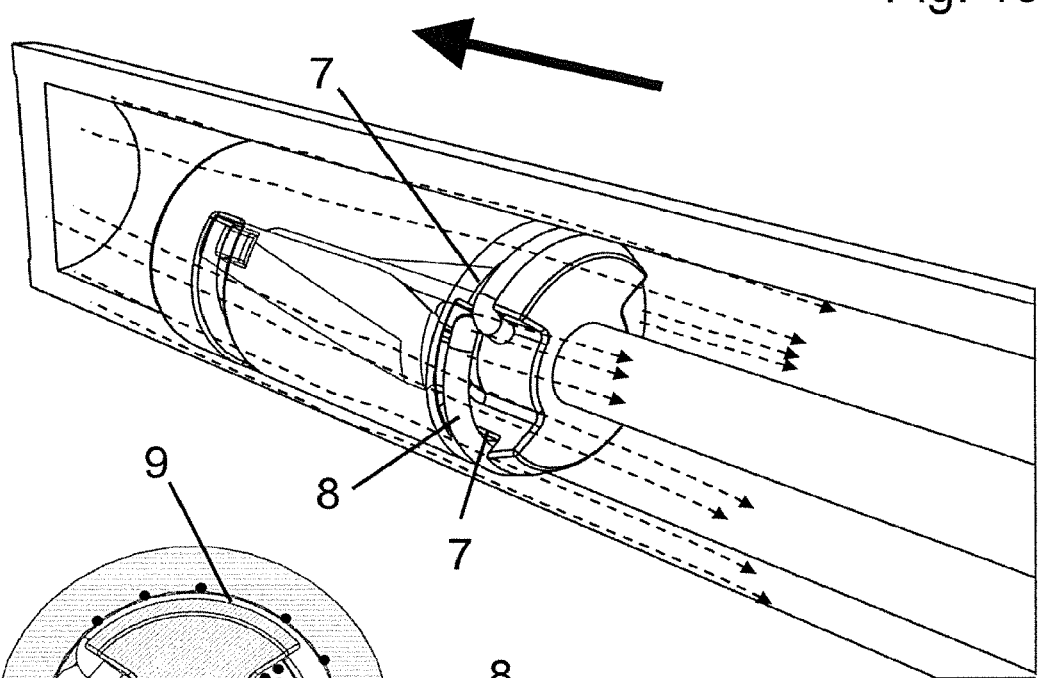
FIG. 18 is a perspective view of the fluid damper of FIG. 14, showing where the components of the fluid damper are located when the speed has increased.
Figure 19:
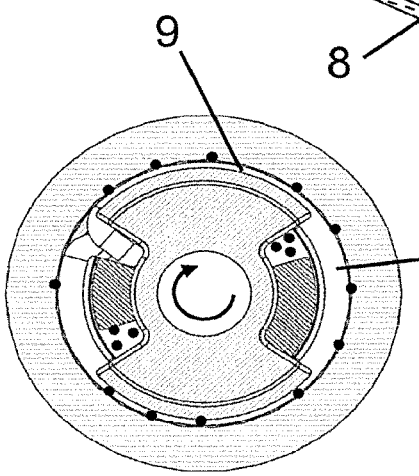
FIG. 19 is a cross section through the fluid damper of FIG. 14, showing where the wings in the piston are located when the piston speed has increased.

FIGS. 2 and 3 show sleeves 2, which are provided with similarly designed wings 2.1', 2.2'. In these two drawings the piston has been omitted, while in FIGS. 4 and 5, the pistons 4 are shown, with the inserted sleeves 2. Particularly in FIG. 6, the fluid displacement element 7 can also be seen, in the form of a drum with two sievelike openings 7.2, 7.3 on their circumference and with one sievelike opening 7.3 on their end.

In FIG. 6, the course of motion upon closure of the furniture parts at low speed of the piston rod 5 is shown. The primary flow of the fluid, in the cross section in FIG. 7, is through the fluid damper through two fluid opening regions 4.1, 4.2. The wings 2.1, 2.2 remain in an outset position. Only a minimal braking action occurs.

In FIG. 8, the overpressure of the piston rod begins. Then the wings 2.1, 2.2, as shown in FIG. 9, rotate counter to the action of the helical spring 3, all the more so the greater the speed is.

When the speed is very high, that is, at a very high pressure of the piston rod 5 on the piston counter to a fluid resistance, the wings 2.1, 2.2 close the through opening regions 4.1, 4.2 so far that, as shown in FIGS. 10, 11, there is now only a slight flow cross section through the piston 4. The fluid flows through the outer gap between the cylinder 1 and the piston 4 and causes a counterforce.

If the speed decreases, then toward the end of the closing process of the furniture parts, a rotary motion of the wings 2.1, 2.2 in the clockwise direction is brought about, which leads to a continuous opening of the fluid passage regions 4.1, 4.2. This consequently leads to a reduction in the piston speed and a soft impact of the furniture parts that are to be closed.

If the pressure acting on the fluid damper is very high, a blockage, shown in FIG. 12 and FIG. 13, of the through opening or fluid opening regions 4.1 and 4.2 can occur. An advantageous refinement of the invention therefore provides that the spring loading, which ensures the necessary restoring force of the at least one wing 2.1, 2.2 in order to uncover the through opening or the fluid opening regions 4.1 and 4.2 is furnished not by an internal helical spring 3, or in addition to an internal helical spring 3, but by a torsion spring 8, such as a rotary spring or a leg spring with legs oriented along the longitudinal axis; this spring is placed in a groove 7, which is located on the outer circumference of the piston 4, between the piston 4 and the cylinder 1.

The groove 7 is advantageously deeper, viewed in the radial direction normal to the longitudinal axis, than the internal diameter of the torsion spring 8, or the material cross section of the spring material of the torsion spring 8, would require. Furthermore, the torsion spring 8, when stressed, is advantageously wound up counter to the restoring force. As a result, its external diameter decreases. When the restoring force is exerted, the spring is unwound again, as a result of which its external diameter is greatest in the position of repose of the piston and when the through opening or fluid opening regions 4.1 and 4.2 are open.

If the torsion spring 8, upon a motion counter to the restoring force, is now compressed and as a result wound around the longitudinal axis, this creates a gap 9 between the piston 4 and cylinder 1. Through this gap, fluid can flow past the piston 4 from one fluid chamber to the other. Alternatively, an already existing gap 9 is enlarged for this purpose.

Accordingly, in a fluid damper as described above, it can be provided that the spring loading, which is provided for the purpose of restoring the wing 2.1, 2.2 and thereby opening the through opening or fluid opening regions 4.1 and 4.2, is effected at least in part by a torsion spring 8 located in a groove 7 on the circumference of the piston 4, between the piston 4 and cylinder 1. This spring is wound around the longitudinal axis when stress counter to the spring loading is exerted, and it has its largest in diameter when the piston 4 is in repose.

In FIG. 14 through FIG. 19, a fluid damper is shown, which still functions perfectly even if there is a change in the ambient temperature, which is associated with a change in the viscosity of a fluid located in the cylinder.

The viscosity of at least certain oils, such as a silicone oil, varies with a change in temperature, on the specification that if the temperature drops, the viscosity of the oil rises.

As a result, the damping force F with which a fluid damper filled with an appropriate oil resists the motion of the piston along the longitudinal axis in the cylinder is also affected. The relationship here is that the damping force increases with decreasing temperature:

$$F=\eta A v/s.$$

To counteract the influence of the temperature, in the fluid damper shown in FIG. 14 through FIG. 19 it is provided that if conditions change, some of the flow volume otherwise passing through the through openings 4.1, 4.2 are rerouted mechanically, for instance by means of a spring force, or are for instance passed through the middle or along the edge of the piston 4. This counteracts a threatened change in the damping resistance.

An advantage surprisingly associated with this is that this principle can also serve as an overload function. As a result, from a particular flow, some of the flow volume can be moved past, for instance through the middle or at the edge of the piston 4, as a result of which peak loads can be averted.

It is apparent that the invention is realized by a fluid damper for furniture parts that are movable relative to one another, the fluid damper having a piston 4 guided adjustably in a cylinder 1, the piston being connected to a piston rod 5, extended out of the cylinder 1, that can be put into contact with the adjustable furniture part, as follows:

the cylinder 1 is connected both to the closed end that does not have a piston rod and to the fixed furniture part, and in the piston 4, at least one through opening 4.1 is provided for a fluid located in the cylinder 1;

if the furniture parts move counter to one another, or in other words toward one another, as a function of the speed or pressure on the piston rod 5 a wing 2.1, rotatably supported in the piston 4, progressively closes the through opening 4.1 in the piston 4, and if the furniture parts move away from one another, a helical spring 3 moves the wing 2.1 back again and opens the through opening 4.1;

the piston 4 is embodied cylindrically and is adapted with its external diameter to the internal diameter of the cylinder 1;

the cylinder 1 is closed on the open face end by a closure part 6; and a sleeve 2 slipped radially rotatably onto the end of the piston 5 that is located in the cylinder, and this sleeve has two opposed wings 2.1, 2.2; 2.1', 2.2' on its circumference in the longitudinal direction, the outer surfaces of which wings can be slipped onto two fluid passage regions 4.1, 4.2, formed in the piston 4, in order to close these regions, and the sleeve is retained in transverse grooves 4.3, 4.4 of the piston 4 by means of guide elements 2.3, 2.4.

The invention claimed is:

1. A fluid damper for parts movable relative to one another, in particular furniture parts, having
   a piston (4) guided adjustably in a cylinder (1) along a longitudinal axis,
   at least one through opening (4.1, 4.2) for fluid flowing through, which is embodied in the piston (4) and/or between the piston (4) and the cylinder (1),
   a sleeve (2) having wings (2.1, 2.2; 2.1', 2.2'), which is located radially rotatably relative to the piston (4) counter to a fluid flowing through about the longitudinal axis or about an axis extending parallel to the longitudinal axis, and can be put into operative connection with the through openings (4.1, 4.2),
   a hollow-cylindrical part of the piston (4), which along at least a portion of the longitudinal axis radially surrounds the sleeve (2) and the at least one wing (2.1, 2.2; 2.1', 2.2'), located on its circumference;
Wherein, the piston (4) is connected to a piston rod (5) extending out of the cylinder (1), which piston rod is put into contact with an adjustable furniture part; and
Wherein, the sleeve having wings and the fluid damper allow dynamic adjustment of damping characteristics, so that at low speeds of the piston rod, only a minimal braking effect is obtained, while at high velocity and pressure of the piston rod on the piston, the wings narrow the at least one through opening, resulting in a smaller fluid flow through the piston, generating a counterforce, then as speed decreases at the end of a closing action, a spring (3) rotates the wings clockwise, opening the at least one through opening, resulting in a smooth furniture closing action.

2. The fluid damper of claim 1,
characterized in that
the sleeve (2) is retained radially rotatably on the piston (4) by means of a detent connection.

3. The fluid damper of claim 1,
characterized in that
the sleeve (2) includes guide elements (2.3, 2.4), engaging the sleeve (2) on the inside relative to the piston (4), as radially rotatably located retention detent connections in transverse grooves (4.3, 4.4).

4. The fluid damper of claim 1,
characterized in that
the wings (2.1, 2.2; 2.1', 2.2') progressively close the at least one through opening (4.1, 4.2) counter to a pressure exerted on the fluid damper and opens it both the at least one through opening when the fluid damper is unstressed and when a tensile stress is exerted on the fluid damper.

5. The fluid damper of claim 1,
characterized in that
the cylinder (1) is connected to a closed end, that is, the end without a piston rod, and to a fixed furniture part.

6. The fluid damper of claim 1,
characterized in that
the sleeve (2) has two opposed wings (2.1, 2.2; 2.1', 2.2') on its circumference in the longitudinal direction, the outer surfaces of the wings, in order to become closed, being slidable via two through openings (4.1, 4.2) formed in the piston (4) and/or between the piston (4) and the cylinder (1).

7. The fluid damper of claim 1,
characterized in that
said spring (3), which generates a spring loading, is located between the piston (4) and the sleeve (2).

8. The fluid damper of claim 7,
characterized in that
the spring loading is brought about at least partially by a torsion spring (8) located in a groove (7) on a circumference of the piston (4), between the piston (4) and the cylinder (1).

9. The fluid damper of claim 1,
characterized in that
the spring (3), embodied as a helical spring (3), keeps the sleeve (2) in the recessed position when the at least one through opening (4.1, 4.2) is open.

10. The fluid damper of claim 1,
characterized in that
the cylinder (1) is closed with a closure part (6).

11. The fluid damper of claim 1,
characterized in that
in the piston, the at least one through opening (4.1, 4.2) is embodied in sieve fashion, which extends over an angle of preferably 10°-40° each of the circumference of the piston (4).

12. The fluid damper of claim 1,
characterized in that
upon motion of the piston rod (5) at high speed out of an outset position of the at least one wing (2.1, 2.2), the at least one through opening in the piston (1) closes except for a small cross section.

13. The fluid damper of claim 1,
characterized in that
the piston (4) is embodied cylindrically and with an external diameter that is adapted to an internal diameter of the cylinder (1).

14. The fluid damper of claim 1,
characterized in that
at least one compensation opening is provided between the cylinder (1) and the piston (4) and/or in the piston (4).

15. A fluid damper for parts movable relative to one another, in particular furniture parts, having
a piston (4) guided adjustably in a cylinder (1) along a longitudinal axis,
at least one through opening (4.1, 4.2) for fluid flowing through, which is embodied in the piston (4) and/or between the piston (4) and the cylinder (1),
a sleeve (2) having wings (2.1, 2.2; 2.1', 2.2'), which is located radially rotatably relative to the piston (4) counter to a fluid flowing through about the longitudinal axis or about an axis extending parallel to the longitudinal axis, and can be put into operative connection with the through openings (4.1, 4.2),
a hollow-cylindrical part of the piston (4), which along at least a portion of the longitudinal axis radially surrounds the sleeve (2) and the at least one wing (2.1, 2.2; 2.1', 2.2'), located on its circumference;
a piston, sieve fluid displacement element (7) adjoins an inner end face (4) of a closure part (6), by means of which fluid displacement element a piston rod (5) is passed and which has sieve openings (7.1-7.3) on a circumferential surface and an inner end face of said piston rod.

16. The fluid damper of claim 15,
characterized in that
the fluid displacement element (7) is embodied as a plastic foam element.

* * * * *